W. P. DANDLIKER.
FIELD MAGNET STRUCTURE.
APPLICATION FILED APR. 19, 1909.

992,548.

Patented May 16, 1911.

Witnesses
Rob. E. Stoll.
Chas. L. Byron

Inventor
Walter P. Dandliker
By Chas. E. Lord
Attorney

UNITED STATES PATENT OFFICE.

WALTER P. DANDLIKER, OF WEST ALLIS, WISCONSIN, ASSIGNOR TO ALLIS-CHALMERS COMPANY, A CORPORATION OF NEW JERSEY.

FIELD-MAGNET STRUCTURE.

992,548.      Specification of Letters Patent.      Patented May 16, 1911.

Application filed April 19, 1909. Serial No. 490,940.

*To all whom it may concern:*

Be it known that I, WALTER P. DANDLIKER, a citizen of Switzerland, residing at West Allis, in the county of Milwaukee and State of Wisconsin, have invented certain new and useful Improvements in Field-Magnet Structures, of which the following is a full, clear, and exact specification.

This invention relates to rotary members of dynamo-electric machines, and particularly to rotary field members and to the means for clamping and supporting the sides of the field coils so as to prevent lateral displacement of the coils, due to the action of centrifugal force.

The invention has for its main object the provision of coil clamping means which will effectively hold the coils in place and which cannot become loosened so as to release the coils when the latter are rotating at high speeds, but which are so constructed that the coil clamping effect becomes greater as the speed of rotation increases.

My invention contemplates the use of a pair of clamping plates or members between each pair of field magnets and having adjacent convergent faces which are engaged by a spreading block or member which on being moved outwardly spreads the plates and forces the latter into engagement with the coils. The spreading blocks are normally held in position by radial bolts which extend freely through the same into the field frame, and by adjustable nuts adapted to engage the inner ends of the blocks. It will be seen that with this construction centrifugal force will tend to move the blocks outwardly along the bolts and spread the plates and cause the latter to hold the coils so firmly in place that displacement is practically impossible.

The invention may be further briefly summarized as consisting in certain novel details of construction and combination and arrangement of parts which will be described in the specification and set forth in the appended claims.

For a better understanding of my invention reference is had to the accompanying sheet of drawings, in which—

Figure 1:
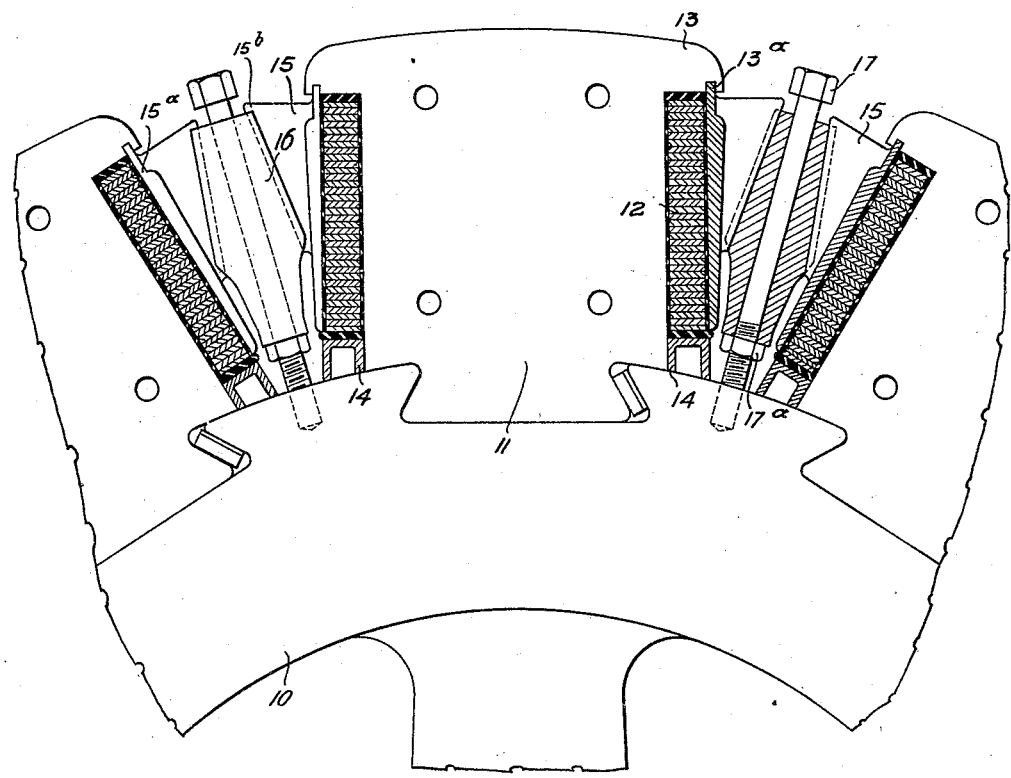
Figure 2:
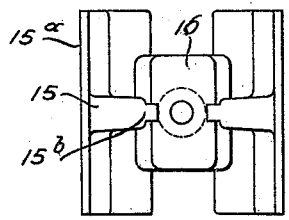

Figure 1 is a side elevation of a portion of the rotary field member provided with coil clamping or supporting means constructed in accordance with my invention, parts being in section, and Fig. 2 is a top plan view of the coöperating clamping devices which are employed between each pair of field magnets.

Referring now to the figures of the drawing, 10 represents the rotary field frame which may be of any suitable construction, and which is provided with a plurality of outwardly projecting field magnets secured to the field frame in any suitable manner such as by dove-tail projections, said field magnets including radial field poles 11 and field coils 12, which, in this case are formed of edgewise wound strap copper and are held against radial movement by overhanging pole tips 13 at the outer ends of the poles, and by collars or coil seats 14 at the bases of the poles.

To hold the sides of the coils in place and to prevent their bulging or spreading outwardly or laterally at high speeds of rotation, I have provided between each pair of field magnets and engaging the opposite or adjacent sides of the coils on these field magnets, coil clamping members 15, preferably in the form of cast metal plates having webs $15^a$ which engage the sides of the coils and conform in shape thereto and with centrally located flanges $15^b$ located opposite and projecting toward each other. The outer portions of the webs $15^a$ engage within grooves or notches $13^a$ in the undersides of the projecting pole tips 13 and are thus held against outward or radial movement. The adjacent faces or edges of the flanges $15^b$ of each pair of clamping members are inclined with respect to each other, and in this case are convergent outwardly; that is, if these faces were prolonged they would converge at some point beyond the periphery of the field magnet. The clamping plates are forced tightly into engagement with the coils and are held in engagement therewith by means of spreading or clamping blocks 16 provided with grooves or recesses which receive the flanges and which have outwardly tapering or convergent faces engaged by the convergent faces of the flanges, so that as these blocks are moved outwardly they will tend to spread the plates laterally or apart and to force them into engagement with the sides of the coils. These blocks are preferably made of some material having considerable weight, such as cast iron, so that the wedging action will be very great when the machine is in operation.

To assist in guiding the clamping blocks 16, and to hold the blocks in proper position when the machine is stationary, I provide radial bolts 17 which extend loosely through central radial or longitudinal openings in the block and have lower threaded ends which engage threaded openings in the field frame. These blocks are normally adjusted and supported by means of nuts 17ª which are mounted on the bolts and engage the inner ends of the blocks.

Thus it will be seen that when the machine is in operation the coil clamping members cannot become loosened by the action of centrifugal force and release the coils, as is the case with a number of coil supporting devices which are employed at the present time, but on the other hand, centrifugal force tends to move the blocks outwardly and to make the coil clamping and tightening action greater than when the machine is stationary, and in fact the greater the speed of rotation the greater the coil clamping action becomes. Furthermore as the speed of rotation increases, the blocks are lifted from the nuts, and therefore all stresses in the latter and in the bolts are entirely removed. The result of this construction is that I have provided coil clamping devices which are extremely effective under all conditions of operation and can be relied upon even at the highest speeds to which the machine will be subjected.

I do not desire to be confined to the exact details shown, but aim in my claims to cover all modifications which do not involve a departure from the spirit and scope of my invention.

What I claim as new and desire to secure by Letters Patent is:

1. In combination, a rotary field member having projecting field magnets comprising field poles and coils, coil bracing plates between the field magnets and engaging the sides of the coils, a separate guiding member extending into the field frame, and means coöperating with said guiding member for automatically forcing said coil bracing plates against the coils during the operation of the machine.

2. In combination, a rotary field member comprising a frame, field magnets secured to said frame and including field poles and coils, coil bracing plates between the field magnets and engaging the sides of the coils, the adjacent plates having outwardly converging portions, wedging or spreading members engaging said portions, and radial bolts extending through said wedging members into the frame.

3. In combination, a rotary field member comprising a field frame, field magnets including poles and coils secured to said frame, coil bracing plates between the field magnets and engaging the sides of the coils, the adjacent plates having outwardly convergent or tapered portions and wedging or spreading members engaging said portions, radial bolts extending through said spreading members into the field frame, and means for moving said members outwardly along the bolts so as to force the clamping plates into engagement with the coils.

4. In combination, a rotary field member comprising a field frame, field magnets including field poles and coils, coil bracing plates between the magnets and engaging the sides of the coils, and a spreading member between each pair of adjacent plates, said spreading member and the clamping plates on opposite sides thereof having interfitting grooves and flanges provided with outwardly convergent or tapered engaging faces, radial bolts extending through the spreading members into the field frame, and nuts on said bolts engaging the inner ends of said spreading members.

5. In a rotatable member for dynamo-electric machines, the combination with projecting field magnets comprising poles and coils thereon, of means including a single guiding member between every two poles for automatically tightening said coils during the operation of the machine.

6. In a rotatable member for dynamo-electric machines, the combination of projecting field poles having coils thereon, and centrifugally operated means including a wedging member supported on a single rod for tightening said coils.

7. In combination, a rotary field member having projecting field magnets comprising poles and coils, coil bracing plates engaging the sides of said coils, wedges located between said coil bracing plates for automatically tightening said coils during the operation of said machine, and rods between the bracing plates for guiding and supporting said wedges.

8. In combination, a rotary field member having projecting field magnets comprising poles and coils, bracing plates engaging said coils, means engaging said plates for automatically tightening said coils during the operation of said machine, and separate means for guiding said automatic tightening means.

9. In a dynamo-electric machine, a rotary field member comprising a frame, spaced projecting field magnets mounted on said frame and comprising coils and cores, a pair of bracing plates in each of the spaces between the field magnets and engaging the coils of the respective adjacent field magnets, the spacing plates of each pair being provided with opposed inclined surfaces which converge outwardly, a wedging member between such surfaces of each pair of bracing plates, and means engaging said frame and said wedging members for forcing the latter outwardly.

In testimony whereof I affix my signature, in the presence of two witnesses.

WALTER P. DANDLIKER.

Witnesses:
H. C. CASE,
CHAS. L. BYRON.

Copies of this patent may be obtained for five cents each, by addressing the "Commissioner of Patents, Washington, D. C."